United States Patent
Hou et al.

(10) Patent No.: US 11,940,269 B1
(45) Date of Patent: Mar. 26, 2024

(54) FEATURE LOCATION DETECTION UTILIZING DEPTH SENSOR

(71) Applicant: MLOptic Corp, Redmond, WA (US)

(72) Inventors: Bailing Hou, Sammamish, WA (US);
Wei Zhou, Sammamish, WA (US);
Jiang He, Redmond, WA (US);
Yuanqin Wang, Goleta, CA (US)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 18/375,142

(22) Filed: Sep. 29, 2023

(51) Int. Cl.
  *G01B 21/24* (2006.01)
  *G01B 21/04* (2006.01)
  *G01B 21/16* (2006.01)
  *G01B 21/18* (2006.01)

(52) U.S. Cl.
  CPC ........... *G01B 21/24* (2013.01); *G01B 21/047* (2013.01); *G01B 21/16* (2013.01); *G01B 21/18* (2013.01)

(58) Field of Classification Search
  CPC ........ G01B 17/00; G01B 5/066; G01B 7/023; G01B 7/06; G01B 13/02; G01B 15/04; G01B 5/18; G01B 7/02; G01B 7/085; G01B 7/12; G01B 7/13; G01B 7/26; G01B 7/312; G01B 21/18; G01B 3/02
  USPC ........................................ 73/290 R
  See application file for complete search history.

(56) References Cited

FOREIGN PATENT DOCUMENTS

| CH | 711155 A2 | * | 12/2016 | |
|---|---|---|---|---|
| CN | 106052586 A | * | 10/2016 | ........... G01B 11/022 |
| CN | 108406731 A | * | 8/2018 | .............. B25J 5/007 |
| CN | 110135232 A | * | 8/2019 | ........... G02B 27/017 |
| CN | 112816967 A | * | 5/2021 | |
| TW | 202119058 A | * | 5/2021 | |
| WO | WO-2013164570 A2 | * | 11/2013 | ........... E21B 47/026 |

* cited by examiner

*Primary Examiner* — Andre J Allen
(74) *Attorney, Agent, or Firm* — Jong Patent Firm; Cheng Ning Jong; Tracy P. Jong

(57) ABSTRACT

A system for determining a location of a feature of an object, the system including a first marker including a first area and a surface having two parallel edges and a third edge disposed perpendicularly to the two parallel edges, the two parallel edges are disposed about a first central axis of the two parallel edges; and a sensor configured to provide a distance from the sensor to a portion of the first marker, wherein the sensor is adapted to obtain distances between the sensor and the first marker and an environment surrounding the first marker to form a first map representing the distances corresponding to locations from which the distances are obtained using the sensor and the location of the feature of the object is determined based on at least one corner corresponding to an intersection formed of the third edge and one of the two parallel edges.

14 Claims, 7 Drawing Sheets

FEATURE LOCATION DETECTION UTILIZING DEPTH SENSOR

1. THE FIELD OF THE INVENTION

The present invention relates to an apparatus and a method for detecting a feature location using a depth sensor. More specifically, the present invention is directed to an apparatus and a method for detecting the location of an optical axis of an optical device using a depth sensor.

2. BACKGROUND ART

Various techniques have been attempted for determining the location of a feature for alignment purposes. Machine vision has been a popular solution for applications which do not require precise determination of feature locations. Machine vision systems have gained significant prominence in various industries due to their ability to automate and enhance processes that involve the inspection, measurement and recognition of objects or features within a given field of view. These systems employ various optical sensors, cameras and computer algorithms to capture and analyze images of objects, enabling the extraction of valuable information regarding the object's characteristics, including the location of specific features.

While machine vision systems have demonstrated remarkable capabilities in many applications, there exist several inherent drawbacks and limitations when it comes to accurately determining the location of features on an object. These drawbacks have prompted the need for innovative solutions to improve the precision, reliability, and efficiency of machine vision-based feature location determination. Some of the notable drawbacks associated with conventional machine vision systems include noise and variability where machine vision systems are susceptible to noise and variability in image data due to factors such as lighting conditions, camera characteristics and object surface properties. This can lead to inaccuracies in feature location determinations. Objects with intricate or irregular shapes can pose challenges for machine vision systems as traditional algorithms may struggle to identify and locate features accurately on such objects. Further a machine vision system often lacks significant depth perception. Many machine vision systems primarily operate in two dimensions (2D) and may lack robust depth perception capabilities, making it challenging to accurately locate features in three-dimensional (3D) space. Complex feature location algorithms may require substantial computational resources, leading to longer processing times and potential real-time operation limitations. Machine vision systems often require precise calibration to account for lens distortion, camera alignment and other factors. Calibration errors can lead to inaccuracies in feature location. The implementation and maintenance of high-performance machine vision systems can be costly and complex, limiting their accessibility to a broader range of applications.

There exists a need for a precise, simpler, fast and cost-effective mechanism that is computationally less intensive and one that is less susceptible to environmental changes for determining the location of a feature especially when the location is required to be determined over numerous cycles.

SUMMARY OF THE INVENTION

In accordance with the present invention, there is provided a system for determining a location of a feature of an object, the system including:

(a) a first marker including a first area and a surface having two parallel edges and a third edge disposed perpendicularly to the two parallel edges, the two parallel edges are disposed about a first central axis of the two parallel edges; and (b) a sensor configured to provide a distance from the sensor to a portion of the first marker, wherein the sensor is adapted to obtain distances between the sensor and the first marker and an environment surrounding the first marker to form a first map representing the distances corresponding to locations from which the distances are obtained using the sensor and the location of the feature of the object is determined based on at least one corner corresponding to an intersection formed of the third edge and one of the two parallel edges.

In one embodiment, the system further includes a second marker including a second area and a surface having two parallel edges and a third edge disposed perpendicularly to the two parallel edges of the second marker, the two parallel edges of the second marker are disposed about a second central axis of the two parallel edges of the second marker, wherein the first area is smaller than the second area, the first marker is disposed with the surface of the first marker parallel to the surface of the second marker and the first central axis is disposed parallel to the second central axis and the first central axis, the second axis and the feature of the object aligned in a plane, the sensor is further adapted to obtain distances between the sensor and said second marker and an environment surrounding the second marker to form a second map representing the distances corresponding to locations from which the distances are obtained using the sensor, the second marker is disposed at a distance greater than the first marker from the sensor and the location of the feature of the object is confirmed based on at least one corner corresponding to an intersection formed of the third edge and one of the two parallel edges of the second marker.

In accordance with the present invention, there is further provided a method for determining a location of a feature of an object using a distance sensor, the method including:

(a) associating a first marker with the object, the first marker including a first area and a surface having two parallel edges and a third edge disposed perpendicularly to the two parallel edges, the two parallel edges are disposed about a first central axis of the two parallel edges;

(b) establishing a first two-dimensional grid of distance measurements covering an area larger than the first area including the first area using the distance sensor; and (c) determining at least one corner corresponding to an intersection formed of the third edge and one of the two parallel edges from said first two-dimensional grid of distance measurements and calculating the location of the feature based on a location of the at least one corner.

In one embodiment, the method further includes:

(a) associating a second marker with the object, the second marker including a second area and a surface having two parallel edges and a third edge disposed perpendicularly to the two parallel edges of the second marker, the two parallel edges of the second marker are disposed about a second central axis, wherein the second area is greater than the first area and the second marker is disposed in a position and orientation such that the first central axis, the second central axis and the feature are disposed in a plane and the second marker is disposed at a distance greater than the first marker from the distance sensor;

(b) replacing the establishing step with establishing a second two-dimensional grid of distance measurements covering an area larger than the second area including the second area using the distance sensor; and (c) determining at least one second corner corresponding to an intersection formed of the third edge and one of the two parallel edges of the second marker from the second two-dimensional grid of distance measurements and confirming the location of the feature based on a location of the at least one second corner.

In one embodiment, at least one of the surface of the first marker and the second marker is a rectangular surface. In one embodiment, each of the first marker and the second marker is attached to a mechanical datum of the object. In one embodiment, the feature is a plane in which an axis of the object is disposed. In one embodiment, the sensor is a one-dimensional depth sensor. In one embodiment, the sensor is directed perpendicularly at the surface of the first marker. In one embodiment, the sensor is directed at a cant with respect to the surface of the first marker.

An object of the present invention is to provide a system and method for identifying the location of a feature, e.g., the optical axis of a lens assembly.

Another object of the present invention is to provide a system and method for identifying the location of a feature, e.g., the optical axis of a lens assembly using only a depth sensor.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—depth sensor
4—controller or computer
6—device under test (DUT)
8—optical axis
10—first marker
12—second marker
14—grid of location from which depths are obtained
16—a location from which a depth is obtained
18—computed midpoint
20—mounting hardware
22—mechanical datum
24—lens
26—edge of DUT
28—curve representing distances between sensor and DUT and various sensing locations
30—obstacle
32—plane within which sensor is configured to operate from
34—corner
36—corner
38—plane tangent to surface of barrel
40—distances corresponding to first marker
42—distances corresponding to second marker
44—top edge of first marker
46—top edge of second marker

PARTICULAR ADVANTAGES OF THE INVENTION

Unlike traditional machine vision systems that rely heavily on ambient lighting, the present system utilizes depth sensing technology. As a result, it is considerably less sensitive to variations in lighting conditions, including low-light environments or strong glare, ensuring consistent and reliable feature location detection. In contrast with machine vision systems which often require meticulous calibration to correct for lens distortion and alignment, the present system operates effectively without the need for extensive calibration, reducing setup time and complexity.

In one embodiment, the present system excels in accurately locating features on an object with intricate, irregular or complex geometries by associating at least one known, unique and simple surface to the object to be easily identified such that inferences and/or calculations of the location of a feature of the object can be made with little computational overhead. By relying on depth sensor data, the present system streamlines the computational requirements for feature location determination. This results in significantly reduced processing times, making it ideal for real-time or high-throughput applications. The use of a depth sensor as the primary sensing modality simplifies the hardware setup and reduces equipment costs. This makes the invention more accessible to a wide range of industries and applications.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 2:
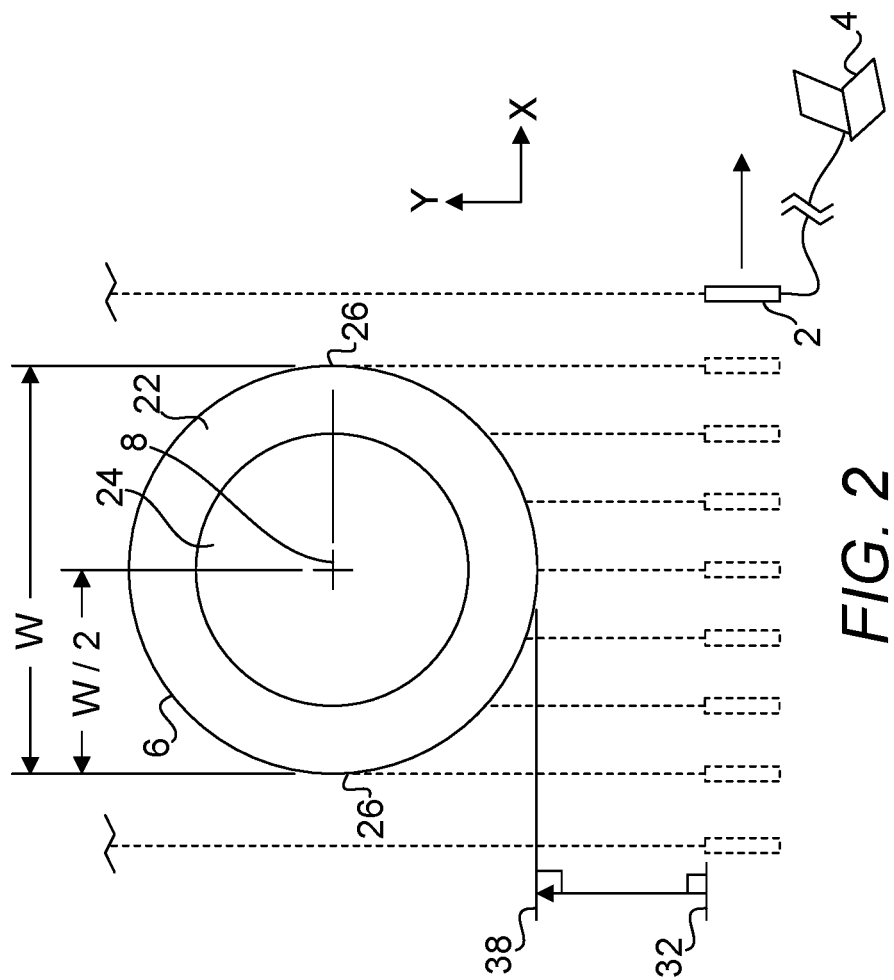
FIG. 2 is a top view of the DUT shown in FIG. 1, depicting the positioning of a depth sensor useful for obtaining distances between the depth sensor and the DUT in a single pass.
Figure 1:
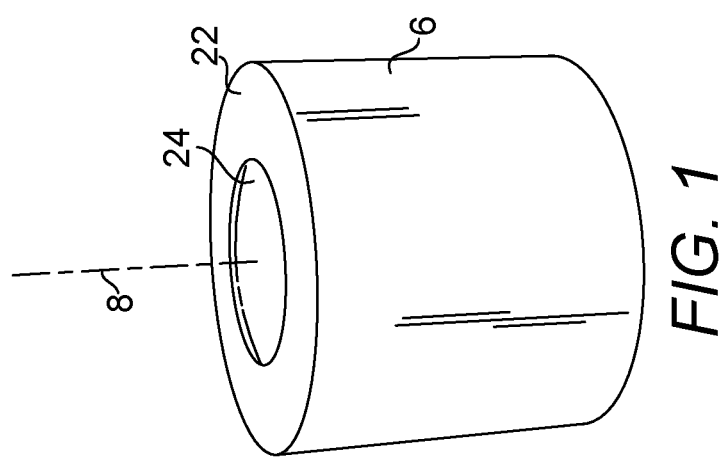
FIG. 1 is a top perspective view of a device under test (DUT) where the location of a feature of the DUT is required to be determined.
Figure 3:
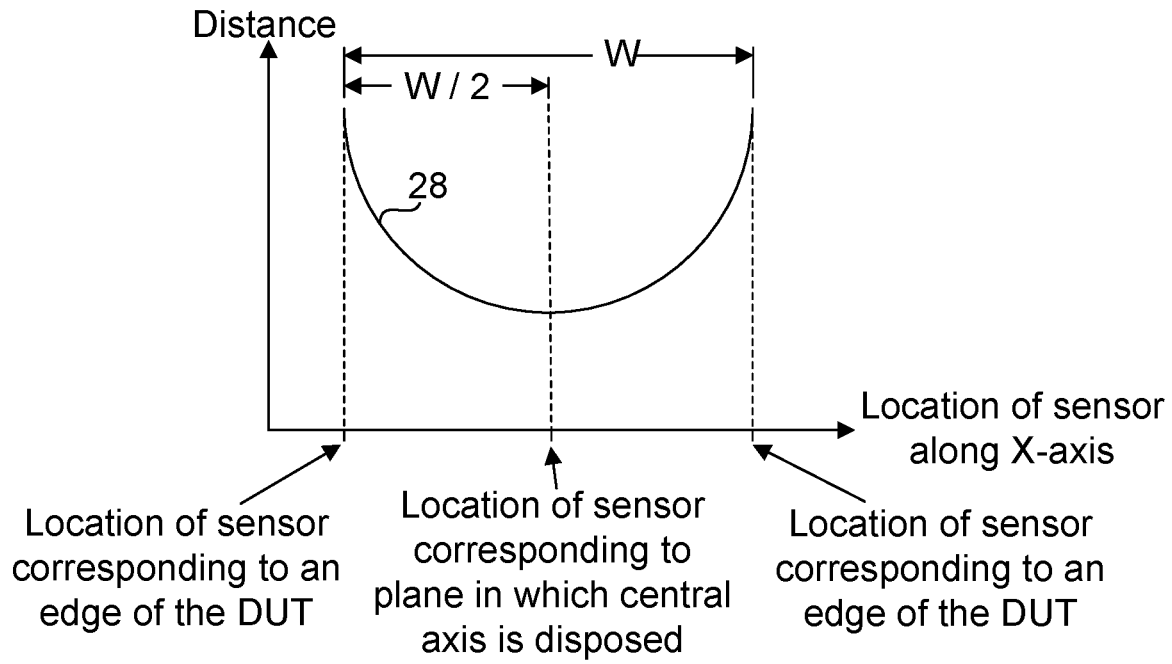
FIG. 3 is a plot of the distances between the depth sensor and the DUT with respect to the location of the sensor for the scenario shown in FIG. 2.
Figure 4:
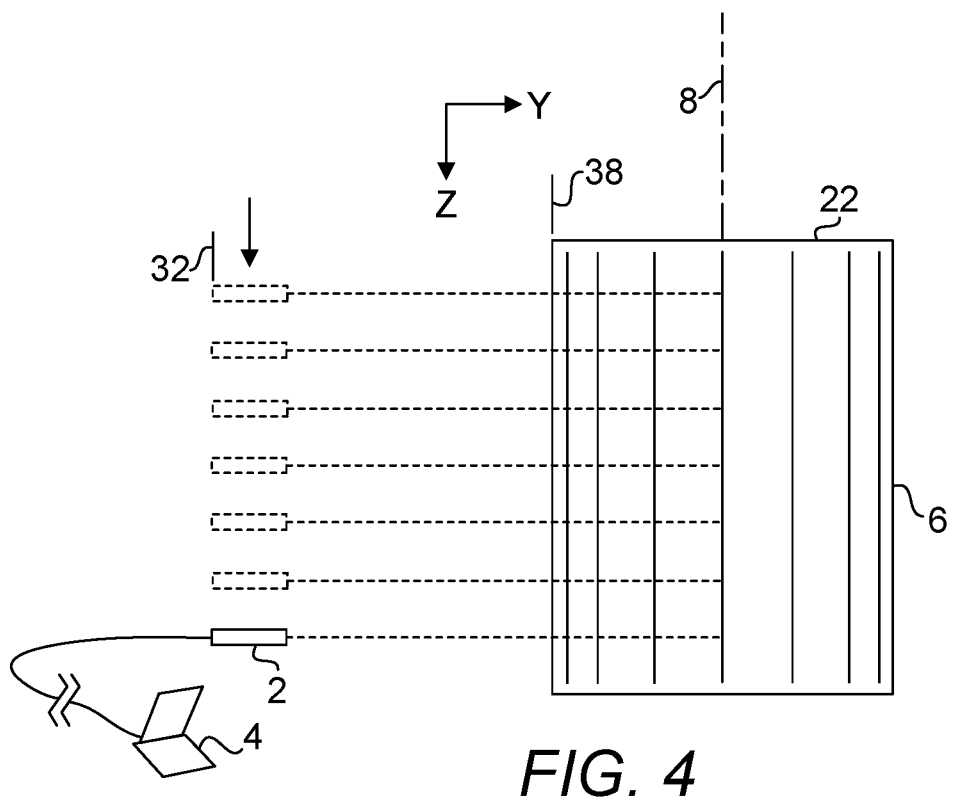
FIG. 4 is a side view of the DUT shown in FIG. 2, depicting the positioning of a depth sensor useful for creating a map representing the distances corresponding to locations from which the distances are obtained.

FIG. 1 is a top perspective view of a device under test (DUT) where the location of a feature of the DUT is required to be determined. FIG. 2 is a top view of the DUT shown in FIG. 1, depicting the positioning of a depth sensor useful for obtaining distances between the depth sensor and the DUT in a single pass. FIG. 3 is a plot of the distances between the depth sensor and the DUT with respect to the location of the sensor for the scenario shown in FIG. 2. In this example, the feature is a plane in which an axis of the DUT or object is disposed. Here, the location of the feature to be determined is the location of the optical axis 8 of a DUT, e.g., optical device. In this example, the optical device 6 is a lens supplied with a lens system contained in a barrel. In a lens, the optical axis 8 can be treated as an axis coinciding with the central axis of the last lens 24 disposed in the barrel and surrounded by a front plate which can be treated as a mechanical datum 22 if necessary. As the barrel of the lens has been precisely made and lacks non-symmetrically disposed surface features, the central axis of the barrel can be said to coincide with the central axis of the DUT, i.e., optical axis 8, the outer surface of the barrel may be mapped using a depth sensor 2 as shown in FIG. 2 to result in a plot 28 of the distances between the depth sensor 2 and the DUT 6 along an X-axis where horizontal edges of the distance data correspond to the two parallel edges 26 of the DUT 6. To simplify computations requirements, the plane 32 within which the depth sensor 2 operates is disposed perpendicularly to the barrel. Note that plane 32 is parallel to a plane 38 that is tangent to the barrel. Therefore, the plane in which the central axis of the barrel or the optical axis of the lens would be an average location between the two edges, i.e., a mid-point between the two edges. A depth sensor, as used herein, is any sensor capable of providing distance between a front face of the sensor and an object disposed at a distance from the sensor, e.g., a Time-of-Flight (ToF) sensor, an ultrasonic sensor, etc., which provide non-contact measurements of the distance between the sensor and the object. A ToF sensor is configured to emit light or laser pulses and measure the time it takes for the light to bounce off the object it is directed at and return to the sensor, providing depth information with high accuracy and speed. The depth sensor 2 is configured to be functionally connected to a controller or computer 4. In use, the depth sensor 2 may be configured or preprogrammed to follow a routine to first capture the distance data at locations defined by a grid pattern such that the distance data may be acted on by the computer 4. Upon completion of data collection, the controller or computer 4 is configured to locate a certain pattern embedded within the distance data. In the embodiment disclosed in FIGS. 2-4, the target pattern is a distance-sensor location graph that is a half-circle shape curve with two peak values one on each end of the curve. Each peak value coincides with an edge of the barrel. Although distance data can certainly be obtained outside of the width of the barrel, this data can easily be weeded out and ignored by only displaying distance data of no more than a certain magnitude to avoid consideration of distance data impertinent to the determination of the edges. In collecting the distances, sensor 2 is configured to move in a direction along the X-axis where distances are obtained, e.g., at regular intervals. Although only several positions of the sensor 2 are shown, the depth sensor 2 is to be configured to provide data that is commensurate with the resolution of the location information sought. In other words, if location data of the feature that is of higher resolution is required, distance reads will be required of the sensor 2 at more locations along a direction along the X-axis such that more precise edges 26 can be determined. FIG. 4 is a side view of the DUT shown in FIG. 2, depicting the positioning of a depth sensor 2 useful for creating a map representing the distances corresponding to locations from which the distances are obtained. Upon completing a single pass along the X-axis, the depth sensor 2 is advanced in the Z-direction where the single pass action along the X-axis is repeated. This continues until a map is obtained. With each pass, a mid-point can be determined. Once all the mid-points have been obtained, the aggregate of the mid-points can be used to form a line which represents a line disposed within a plane through which the optical axis is disposed and this line is disposed in a parallel manner to the optical axis. Further, as the relative position of the sensor 2 the barrel is measured and the relative position of the barrel and the optical axis is known, the relative location of the optical axis with respect to the sensor can be calculated. It has now been demonstrated that the location of a feature may be obtained with the use of a depth sensor without costly computing resources or the aid of additional parts, e.g., markers if the feature is located in an object having a rather featureless exterior, an outer shape that is computationally uncomplicated or the location of a feature correlates well with the outer surface of the object within which the feature is disposed. Other techniques for identifying the location of a feature may be used. However, due to design and operational complexities, cost, accuracy and speed at which other techniques can be carried out, techniques, e.g., machine vision, may not be suitable for locating the optical axis 8. For use with the present system, other types of sensors may also be possible, e.g., confocal sensors. However, confocal sensors are often sensitive to the reflective properties of surfaces, making them less effective on certain materials. The present system, relying on depth sensing, is less affected by variations in surface reflectivity, ensuring consistent performance across different objects and materials.

Figure 5:
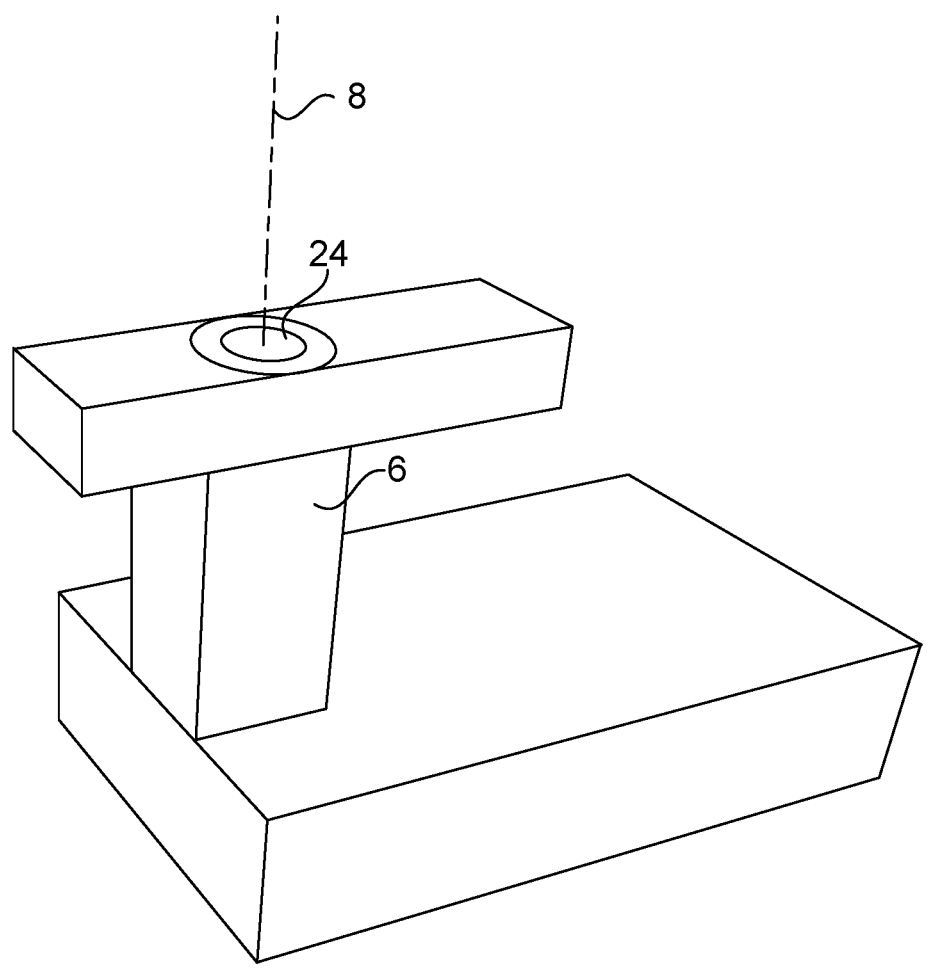
FIG. 5 is a top perspective view of a DUT where the location of a feature is required to be determined.

For an object having a feature which does not correlate well its outer surface, e.g., one shown in FIG. 5, it may be beneficial to utilize a precisely made known marker that is suitable to be positionally associated with the object to allow the use of the marker as a location reference for the determination of the location of a feature. It shall be noted that the exterior surfaces or DUT are irregular in shape and even if there is a portion of the surface that may be identified using the technique disclosed elsewhere herein, the determination may be fraught with errors due to detections of a similar but unintended part of the object.

Figure 6:
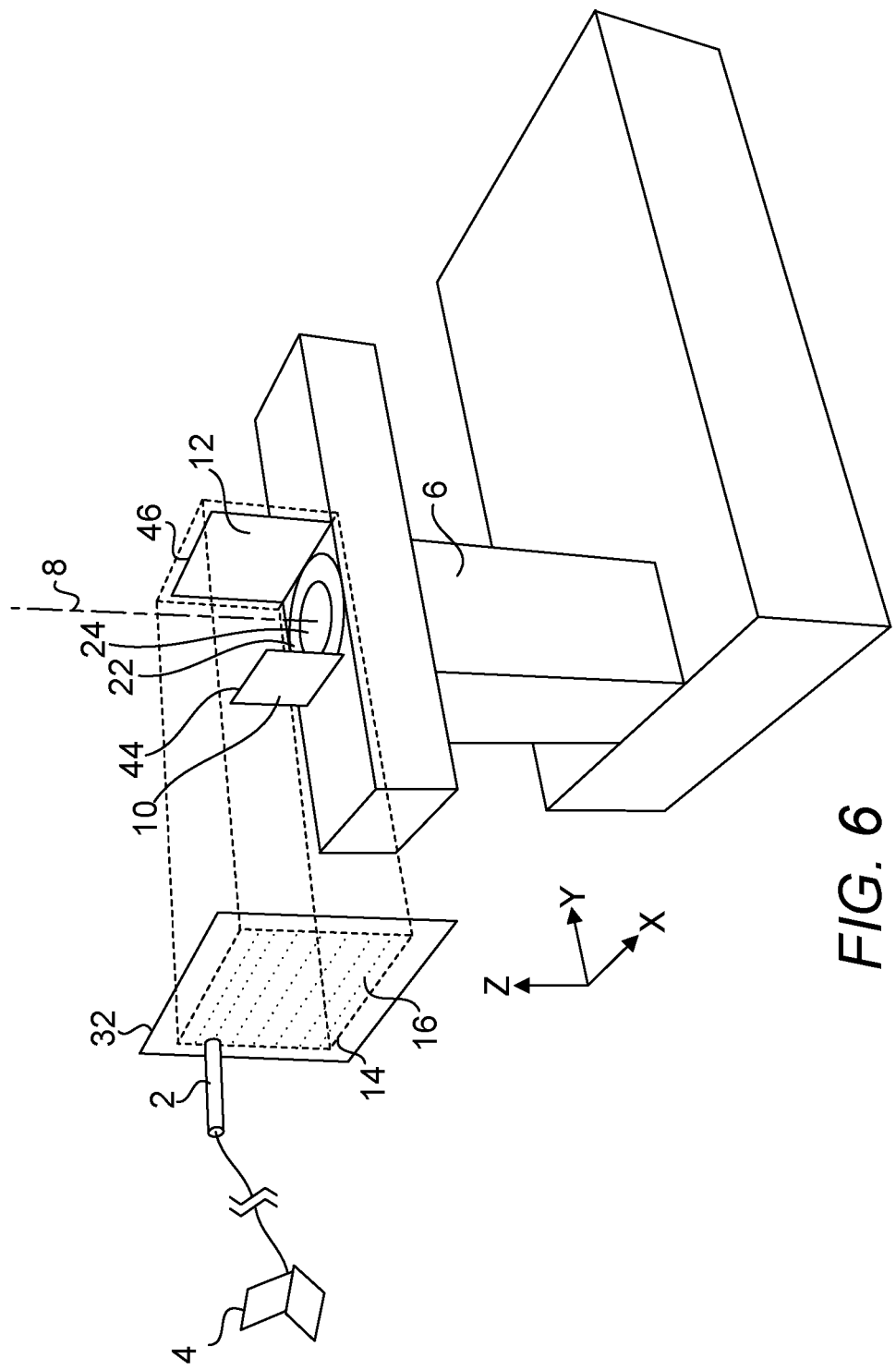
FIG. 6 is a diagram depicting a setup through which the location of the feature of FIG. 5 can be determined using only a depth sensor.
Figure 7:
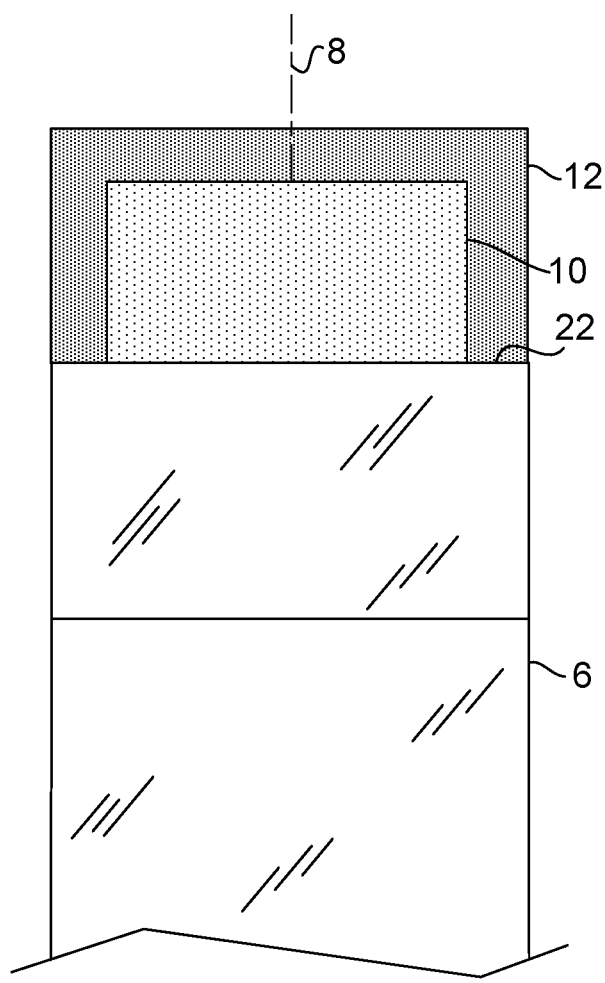
FIG. 7 is a front partial view of the DUT of FIG. 6 where the location of the feature is required to be determined.
Figure 8:
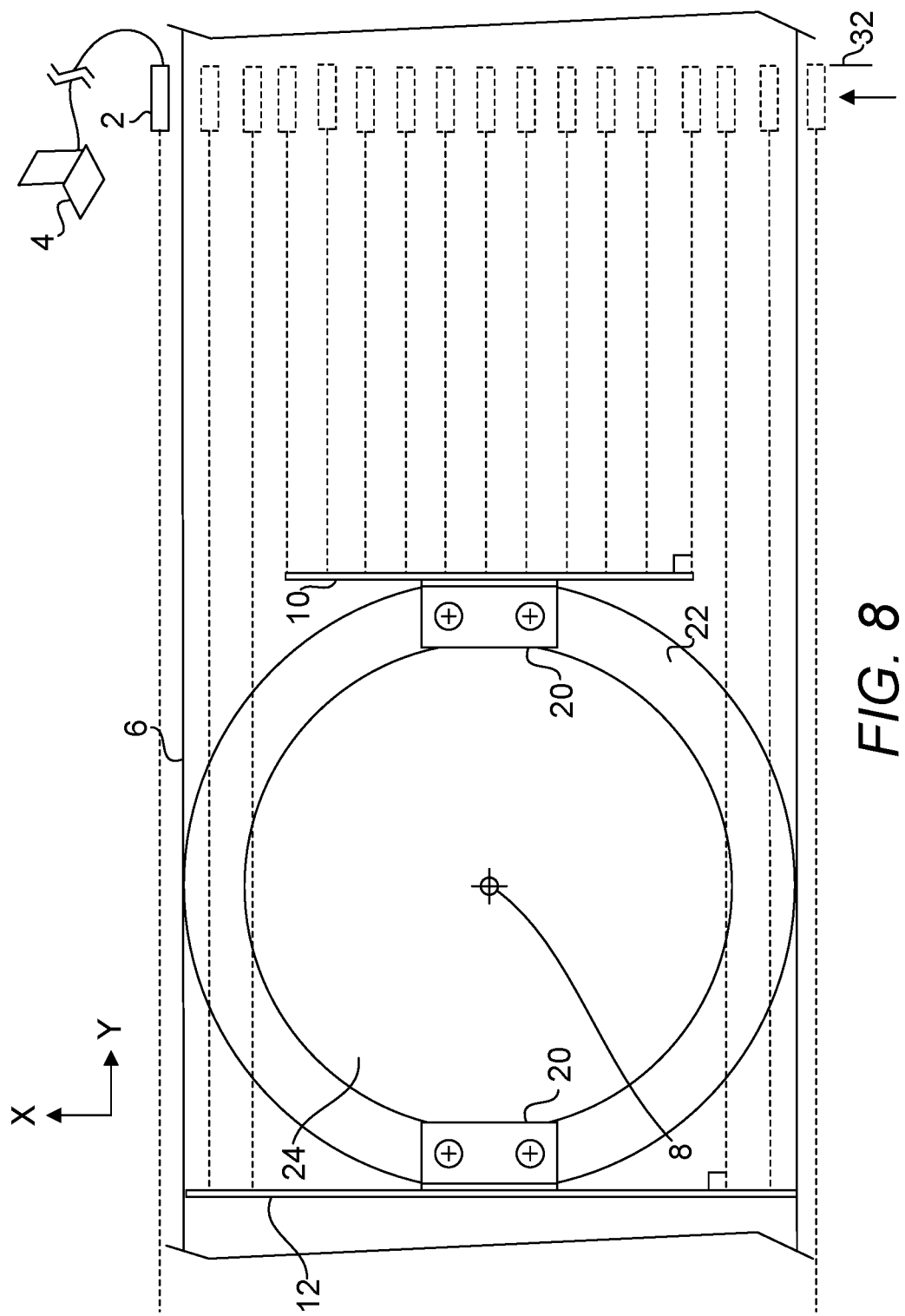
FIG. 8 is a top partial view of the DUT of FIG. 6 where the location of the feature is required to be determined.

FIG. 5 is a top perspective view of a DUT 6 where the location of a feature is required to be determined. Here, the feature is the optical axis 8 of an optical device and its location and therefore orientation as well, are sought such that an alignment, e.g., of the DUT 6, based on the optical axis 8 may be made. The optical device includes an irregular outer shape and therefore would be impractical to apply the same technique to locating the optical axis 8 as the technique shown in FIG. 2. FIG. 6 is a diagram depicting a setup through which the location of the feature or optical axis 8 of FIG. 5 can be determined using only a depth sensor 2. FIG. 7 is a front partial view of the DUT of FIG. 6 where the location of the feature is required to be determined. FIG. 8 is a top partial view of the DUT of FIG. 6 where the location of the feature is required to be determined. The DUT 6 includes a mechanical datum 22 on its front face and the depth sensor 2 is configured to provide a distance from the sensor 2 to a portion of a marker. In this example, the mechanical datum 22 serves as a positional basis upon which two markers are attached. Although only one marker is required, the use of two markers 10, 12 provides data useful for confirming the location of a feature obtained using a single marker. Each of the first marker 10 and the second marker 12 is essentially a uniquely-shaped, broad, flat or planar surface compared to any objects in the operational vicinity of the depth sensor 2. Each marker includes an area and a surface having two parallel edges and a third (top) edge disposed perpendicularly to the two parallel edges. The two parallel edges are disposed about a central axis of the two parallel edges. Rectangular surfaces of unique dimensions are found to be the simplest markers for use with the present system. Their orientations and mounting locations further facilitate their use. For instance, each marker is mounted in a manner such that one of its edges is aligned with the mechanical datum 22 of the DUT 6 and the markers 10, 12 are mounted with their broad faces parallel to one another and the smaller of the two markers 10, 12 is mounted closer to the depth sensor 6 so as not to obscure distance measurements of the other marker. In one example, both markers 10, 12 are each secured to the mechanical datum 22 using mounting hardware 20, e.g., fasteners, angle brackets, etc. Further, each marker is also mounted such that the central axis of the marker is parallel to the optical axis 8. When both markers 10, 12 are used, their central axes shall be parallel to one another and the optical axis 8 and the central axes and the optical axis 8 shall lie in the same plane and the second marker 12 shall have a broad surface that is larger than the first marker 10 to ensure the second marker 12 is visible when viewed with the first marker 10 disposed in front of it. This way, many computations and inferences involved in resolving the location of the optical axis 8 involve only routine arithmetic. Yet further, the depth sensor 2 is configured to operate with the front face of the depth sensor 2 disposed in a plane 32 that is parallel to the broad face of each marker. When a single marker is used, the sensor 2 is adapted to obtain distances between the sensor 2 and the first marker 10 and an environment surrounding the first marker 12 to form a first map representing the distances corresponding to locations 16 from which the distances are obtained using the sensor 2. In one example, the sensor 2 is driven, e.g., on a motion stage, etc., to obtain distances in a manner similar to the manner disclosed elsewhere herein, essentially covering a grid 14 of locations to yield distance measurements corresponding to distances 40.

Figure 9:
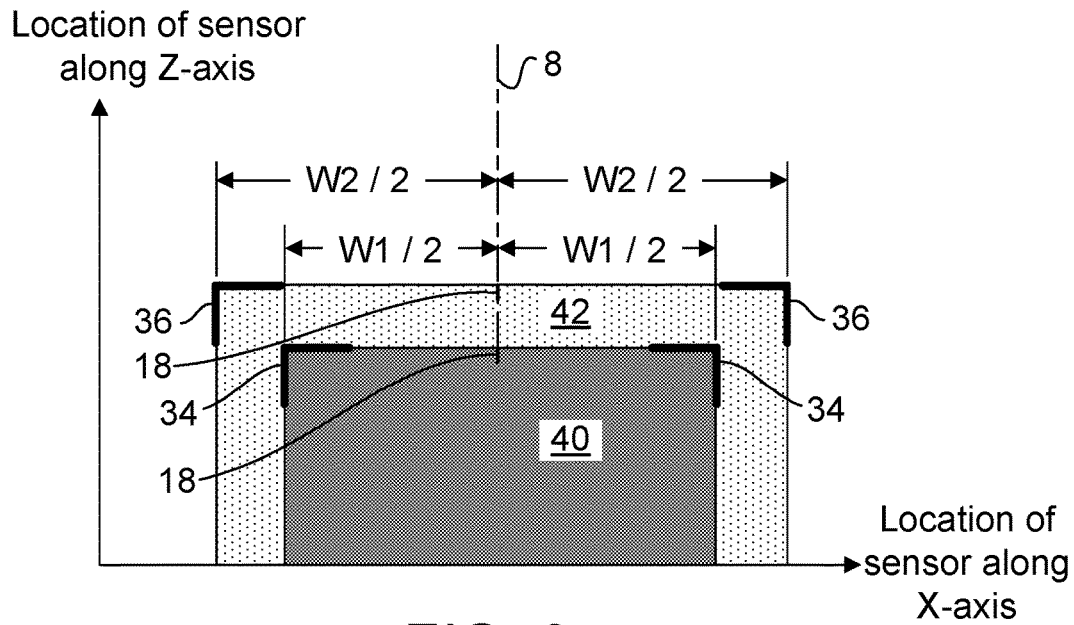
FIG. 9 is a plot of the distances between the depth sensor and the DUT of FIG. 6 for an area disposed within a plane from which the distances are obtained.

FIG. 9 is a plot of the distances between the depth sensor and the DUT of FIG. 6 for an area disposed within a plane 32 from which the distances are obtained. Regardless of whether the second marker exists, the first map is typified by an area having distance values that are similar and uniform within the area showing distances 40. In one embodiment, the controller 4 is configured to detect a "corner" 34, from the distance values where the corner represents a real corner of the first marker 10. As the distance between the sensor 2 and first marker 10 is known as it is the value that is plotted, the location of the optical axis 8 can be inferred or calculated as the physical offset of optical axis 8 from the first marker 10 is also known. A corner corresponds to an intersection formed of the third edge 44 and one of the two parallel edges. The controller 4 can be programmed to detect vertical edges by scanning the distance data in a direction parallel to the X-axis for drastic rise or drop in distance values. For instance, a change of about 1 mm can be seen as a drastic rise or drop in two adjacent distance values. The top edge 44 can be identified by scanning the distance data 40 in a direction parallel to the Z-axis, again for drastic rise or drop in distance values. If the left corner of the first marker 10 has been identified, a plane through which the optical axis 8 is disposed can then be identified as a plane disposed through a calculated midpoint 18. The location of the optical axis 8 can then be resolved by adding a physical offset from the first marker 10. Although the detection of one corner may suffice for some applications, there may be applications where confirmation of the calculated location is crucial. As an example, the optical axis location resolved using the left corner may be verified using the location resolved using the right corner. Here, the calculated midpoint 18 is resolved using an offset from the right edge of the corner. If the calculated midpoint 18 varies depending on whether the left corner or right corner is used, an average value using the left and right edges may be used to represent the midpoint if the application for which the system is utilized can tolerate such inaccuracies. If a second marker 12 is used and exists, the same strategy used for detecting a corner corresponding to the first marker can be used on the second marker 12. Care must be taken to ensure that the sensor 2 is adapted to obtain distances between the sensor 2 and the second marker 10 and an environment surrounding the second marker 12 to form a second map representing the distances corresponding to locations 16 from which the distances are obtained using the sensor 2. The second map can be viewed as a portion of the totality of a distance map covering both the first marker 10 and the second marker 12 or a discrete map generated from a separate dedicated effort in obtaining distance data with respect to the second marker 12. With additional corners 36 identified, calculated midpoints 18 based on left and right edges of the second marker 12 can be obtained and compared and the values should be congruent. Again, if the calculated midpoint 18 varies depending on whether the left corner or right corner is used, an average value using the left and right edges may be used to represent the midpoint if the application for which the system is utilized can tolerate such inaccuracies. A calculated optical axis location based on the second marker 12 can be compared to the location based on the second marker 12 to increase the confidence that an accurate location of the optical axis 8 has been determined. As the second marker 12 is larger than the first marker 10, the calculated midpoint 18 of the top edge 46 of the second marker 12 is disposed at a higher point in the direction of the Z-axis. This provides a second calculated location on the optical axis. Much of what has been described pertains to the manner in which the distance data of a single pass of the depth sensor 2 is used. However, scans due to other passes in the Z-direction can be used to determine not only the location of a single point on an optical axis but a plurality of points which together represent a line coaxial to the optical axis.

It can therefore be summarized that in determining a location of a feature of an object using a distance sensor, a first marker is first associated with the object. The first marker includes a first area and a surface having two parallel edges and a third edge disposed perpendicularly to the two parallel edges. The two parallel edges are disposed about a first central axis of the two parallel edges. A first two-dimensional grid of distance measurements is established to cover an area larger than the first area including the first area using the distance sensor. At least one corner corresponding to an intersection formed of the third edge and one of the two parallel edges is then determined from the first two-dimensional grid of distance measurements. The location of the feature is calculated based on a location of the at least one corner. If a second marker is desired, it is also associated with the object. The second marker includes a second area and a surface having two parallel edges and a third edge disposed perpendicularly to the two parallel edges of the second marker. The two parallel edges of the second marker are disposed about a second central axis. The second area is greater than the first area and the second marker is disposed in a position and orientation such that the first central axis, the second central axis and the feature are disposed in a plane. The second marker is disposed at a distance greater than the first marker from the distance sensor. A second two-dimensional grid of distance measurements is established to cover an area larger than the second area including the second area using the distance sensor. At least one corner corresponding to an intersection formed of the third edge and one of the two parallel edges of the second marker is then determined from the first two-dimensional grid of distance measurements including the second marker. The location of the feature is calculated based on a location of the at least one corner of the first marker or the second marker.

Figure 10:
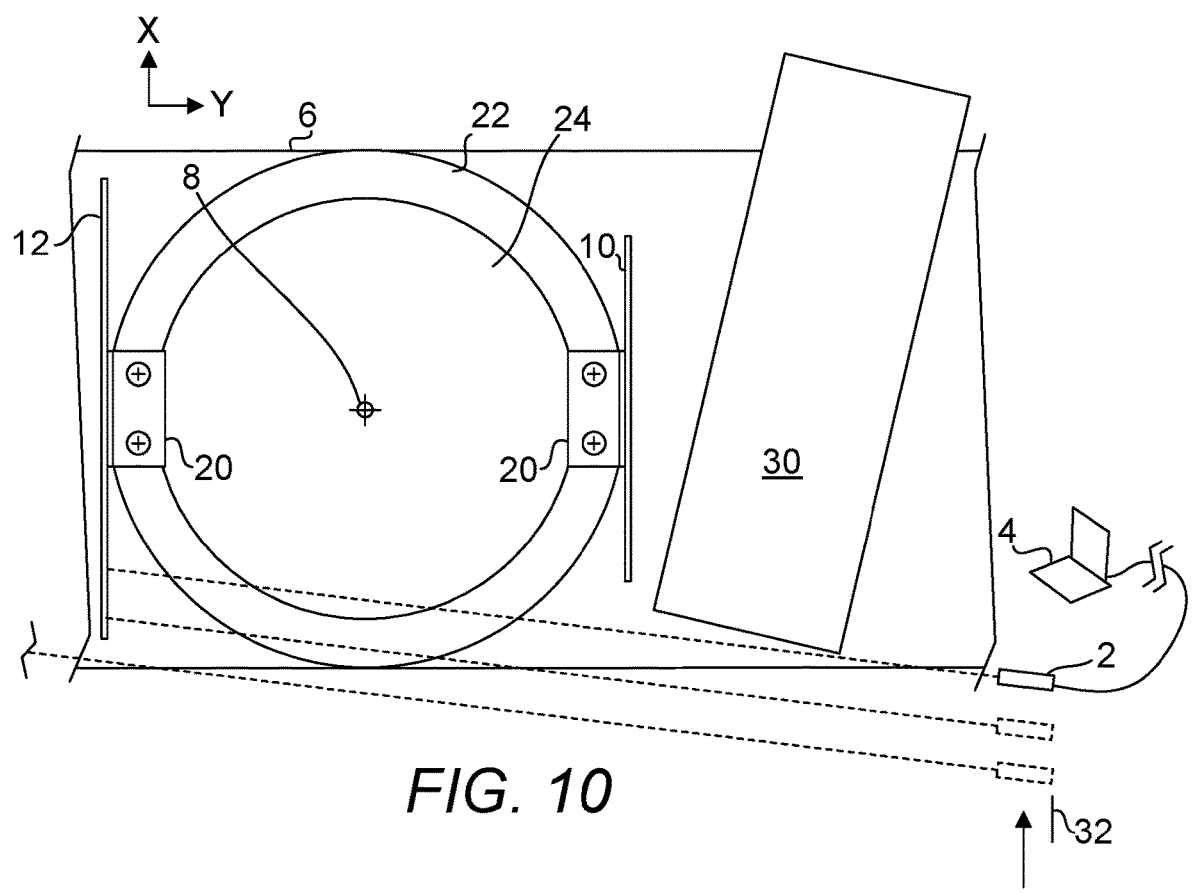
FIG. 10 is a top partial view of the DUT of FIG. 6 where the location of the feature is required to be determined.

FIG. 10 is a top partial view of the DUT of FIG. 6 where the location of the feature is required to be determined. In this example, it is impossible or inconvenient to dispose the depth sensor 2 in a position and orientation to obtain distance measurements in the manner shown elsewhere herein due to the presence of an obstacle 30, e.g., other optics equipment, etc. Here, the sensor 2 is directed at a cant with respect to the surface of either one of the first and second markers 10, 12 and there is sufficient room to accommodate sensor positions which allow detection of just one corner of the second marker 12. It shall be noted that although the sensor 2 is disposed at a cant, the path traversed by the sensor 2 in collecting distance data still remains parallel to the surface of the second marker 12, removing a need for altering the types of computations required to obtain the location of the optical axis 8.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A system for determining a location of a plane in which an axis of an object is disposed, said system comprising:
    (a) a first marker comprising a first area and a surface having two parallel edges and a third edge disposed perpendicularly to said two parallel edges, said two parallel edges are disposed about a first central axis of said two parallel edges; and
    (b) a sensor configured to provide a distance from the sensor to a portion of said first marker,
    wherein said sensor is adapted to obtain distances between said sensor and said first marker and an environment surrounding said first marker to form a first map representing the distances corresponding to locations from which the distances are obtained using said sensor and the location of the plane in which an axis of the object is disposed, is determined based on at least one corner corresponding to an intersection formed of said third edge and one of said two parallel edges.

2. The system of claim 1, further comprising a second marker comprising a second area and a surface having two parallel edges and a third edge disposed perpendicularly to said two parallel edges of said second marker, said two parallel edges of said second marker are disposed about a second central axis of said two parallel edges of said second marker, wherein said first area is smaller than said second area, said first marker is disposed with said surface of said first marker parallel to said surface of said second marker and said first central axis is disposed parallel to said second central axis and said first central axis, said second axis and the plane in which an axis of the object is disposed, aligned in a plane, said sensor is further adapted to obtain distances between said sensor and said second marker and an environment surrounding said second marker to form a second map representing the distances corresponding to locations from which the distances are obtained using said sensor, said second marker is disposed at a distance greater than said first marker from said sensor and the location of the plane in which an axis of the object is disposed, is confirmed based on at least one corner corresponding to an intersection formed of said third edge and one of said two parallel edges of said second marker.

3. The system of claim 2, wherein at least one of said surface of said first marker and said second marker is a rectangular surface.

4. The system of claim 2, wherein each said first marker and said second marker is attached to a mechanical datum of the object.

5. The system of claim 1, wherein said sensor is a one-dimensional depth sensor.

6. The system of claim 1, wherein said sensor is directed perpendicularly at said surface of said first marker.

7. The system of claim 1, wherein said sensor is directed at a cant with respect to said surface of said first marker.

8. A method for determining a location of a plane in which an axis of an object is disposed, using a distance sensor, said method comprising:
   (a) associating a first marker with the object, the first marker comprising a first area and a surface having two parallel edges and a third edge disposed perpendicularly to said two parallel edges, said two parallel edges are disposed about a first central axis of said two parallel edges;
   (b) establishing a first two-dimensional grid of distance measurements covering an area larger than said first area including said first area using the distance sensor; and
   (c) determining at least one corner corresponding to an intersection formed of said third edge and one of said two parallel edges from said first two-dimensional grid of distance measurements and calculating the location of the plane in which an axis of the object is disposed, based on a location of said at least one corner.

9. The method of claim 8, further comprising:
   (a) associating a second marker with the object, the second marker comprising a second area and a surface having two parallel edges and a third edge disposed perpendicularly to said two parallel edges of said second marker, said two parallel edges of said second marker are disposed about a second central axis, wherein said second area is greater than said first area and said second marker is disposed in a position and orientation such that said first central axis, said second central axis and the plane in which an axis of the object is disposed, are disposed in a plane and said second marker is disposed at a distance greater than said first marker from the distance sensor;
   (b) replacing said establishing step with establishing a second two-dimensional grid of distance measurements covering an area larger than said second area including said second area using the distance sensor; and
   (c) determining at least one second corner corresponding to an intersection formed of said third edge and one of said two parallel edges of said second marker from said second two-dimensional grid of distance measurements and confirming the location of the plane in which an axis of the object is disposed, based on a location of said at least one second corner.

10. The method of claim 9, wherein at least one of said surface of said first marker and said second marker is a rectangular surface.

11. The method of claim 9, wherein each said first marker and said second marker is attached to a mechanical datum of the object.

12. The method of claim 8, wherein the sensor is a one-dimensional depth sensor.

13. The method of claim 8, wherein the sensor is directed perpendicularly at said surface of said first marker.

14. The method of claim 8, wherein the sensor is directed at a cant with respect to said surface of said first marker.

* * * * *